United States Patent
Pawliczek et al.

(10) Patent No.: US 11,559,940 B2
(45) Date of Patent: Jan. 24, 2023

(54) INTERCHANGEABLE CHAMBER FOR A DEVICE AND A METHOD FOR GENERATIVELY PRODUCING A THREE-DIMENSIONAL OBJECT

(71) Applicant: EOS GmbH Electro Optical Systems, Krailling (DE)

(72) Inventors: Sven Pawliczek, Gilching (DE); Horst Maier, Planegg (DE); Robert Eichner, Penzberg (DE); Alexander Krüger, Ilmenau (DE)

(73) Assignee: EOS GmBH Electro Optical Systems, Krailling (DE)

(*) Notice: Subject to any disclaimer, the term of this patent is extended or adjusted under 35 U.S.C. 154(b) by 142 days.

(21) Appl. No.: 16/609,863

(22) PCT Filed: May 4, 2017

(86) PCT No.: PCT/EP2017/060704
§ 371 (c)(1),
(2) Date: Oct. 31, 2019

(87) PCT Pub. No.: WO2018/202305
PCT Pub. Date: Nov. 8, 2018

(65) Prior Publication Data
US 2020/0079012 A1    Mar. 12, 2020

(51) Int. Cl.
*B29C 64/245* (2017.01)
*B29C 64/153* (2017.01)
(Continued)

(52) U.S. Cl.
CPC .......... *B29C 64/153* (2017.08); *B29C 64/205* (2017.08); *B29C 64/227* (2017.08);
(Continued)

(58) Field of Classification Search
CPC ... B29C 64/153; B29C 64/245; B29C 64/255; B29C 64/227; B29C 64/268; B29C 64/205; B29C 64/259
See application file for complete search history.

(56) References Cited

U.S. PATENT DOCUMENTS

| 6,554,600 B1 | 3/2003 | Hofmann et al. |
| 2014/0265049 A1* | 9/2014 | Burris .................. B29C 64/277 264/497 |

(Continued)

FOREIGN PATENT DOCUMENTS

| CN | 105328188 | 2/2016 |
| CN | 105722664 | 6/2016 |

(Continued)

OTHER PUBLICATIONS

International Search Report for Application No. PCT/EP2017/060704, dated Feb. 7, 2018, 2 pages.

*Primary Examiner* — Joseph S Del Sole
*Assistant Examiner* — Jamel M Nelson
(74) *Attorney, Agent, or Firm* — Seyfarth Shaw LLP

(57) ABSTRACT

An interchangeable chamber is provided for a 3D printing device, wherein the interchangeable chamber includes a building space for receiving a building platform on which a three-dimensional object can be produced, which building space is designed to be temporarily open in the direction of a top of the interchangeable chamber, as well as optionally a storage container for storing building material and wherein the interchangeable chamber comprises a side wall and a cover, wherein the cover is adapted to close the interchangeable chamber at the top such that building material cannot get through the cover out of nor into the interchangeable chamber and the cover is coupled with the side wall.

13 Claims, 5 Drawing Sheets

(51) Int. Cl.
  *B29C 64/255* (2017.01)
  *B29C 64/227* (2017.01)
  *B29C 64/268* (2017.01)
  *B29C 64/205* (2017.01)
  *B33Y 40/00* (2020.01)
  *B33Y 10/00* (2015.01)
  *B33Y 30/00* (2015.01)

(52) U.S. Cl.
  CPC .......... *B29C 64/245* (2017.08); *B29C 64/255* (2017.08); *B29C 64/268* (2017.08); *B33Y 40/00* (2014.12); *B33Y 10/00* (2014.12); *B33Y 30/00* (2014.12)

(56) References Cited

U.S. PATENT DOCUMENTS

| | | | |
|---|---|---|---|
| 2015/0202687 A1 | 7/2015 | Pialot et al. | |
| 2016/0279871 A1 | 9/2016 | Heugel et al. | |
| 2016/0288421 A1 | 10/2016 | Costabeber | |
| 2016/0339644 A1* | 11/2016 | Sobue | B29C 64/147 |
| 2017/0246797 A1* | 8/2017 | Lambrecht | B29C 64/255 |

FOREIGN PATENT DOCUMENTS

| | | | |
|---|---|---|---|
| CN | 105793016 | 7/2016 | |
| DE | 102009020987 | 11/2010 | |
| DE | 202016007110 U1 * | 1/2017 | ............. A43C 19/00 |
| DE | 202016007110 | 3/2017 | |
| DE | 202016007110 U1 * | 3/2017 | |
| WO | 2000021736 | 4/2000 | |
| WO | 2017121995 | 7/2017 | |

* cited by examiner

INTERCHANGEABLE CHAMBER FOR A DEVICE AND A METHOD FOR GENERATIVELY PRODUCING A THREE-DIMENSIONAL OBJECT

TECHNICAL FIELD OF THE INVENTION

The present invention relates to an interchangeable chamber for a device and for a method for generatively producing a three-dimensional object by applying, layer by layer, and selectively solidifying of a building material, preferably a powder, as well as to such a device and such a method.

BACKGROUND OF THE INVENTION

WO 2000/021736 describes a device and a method for generatively producing a three-dimensional object in which device and in which method an interchangeable container forming a boundary frame is inserted into a building space, in which interchangeable container a workpiece platform being movable in height is integrated as a bottom. The interchangeable container can be removed from the building space after sintering of the object in order to let it cool outside the sintering machine. Immediately after removing the interchangeable container, a new interchangeable container can be inserted into the sintering machine.

SUMMARY OF THE INVENTION

It is an object of the present invention to provide an alternative or improved device or an alternative or improved method for the generative production of a three-dimensional object by applying, layer by layer, and selectively solidifying of a building material, in which device and in which method preferably the operating safety is increased or the efficiency is improved.

The object is achieved by an interchangeable chamber for a device for producing a three-dimensional object according to patent claim 1, a device for producing a three-dimensional object according to patent claim 11 and a method for producing a three-dimensional object according to patent claim 14. Further developments of the invention are given in the dependent claims each. The method can also be further developed by the features of the devices described below or in the dependent claims, or vice versa, and the features of the devices can also be combined among each other.

According to the invention, the interchangeable chamber for a device for producing a three-dimensional object by selectively layer-wise solidifying of a building material at locations that correspond to the cross-section of the object to be produced in the respective layer comprises a building space for receiving a building platform on which the three-dimensional object can be produced, wherein the building space is designed to be temporarily open in the direction of a top of the interchangeable chamber, and optionally a storage container for storing building material. The interchangeable chamber comprises a side wall and a cover, wherein the cover is adapted to close the interchangeable chamber at the top such that building material substantially cannot get through the cover out of nor into the interchangeable chamber and wherein the cover is coupled with the side wall, in particular pivotably and/or displaceably coupled.

The interchangeable chamber has, for example, the advantage that it can be inserted into the device for the generative production of the three-dimensional object and can be removed from the device immediately after the object has been produced, since for removing the interchangeable chamber it can be closed by means of the cover. Waiting periods after the end of the building process are much shorter or no longer required. As a result, immediately after completion of an object another similar interchangeable chamber can be inserted and thus machine downtime can be reduced and the productivity of the device can be increased. Furthermore, for example, the interchangeable chamber can be safely brought to other locations for subsequent steps in a production chain, for example a step of cooling, and thus facilitating the implementation of further steps.

In particular, the cover of the interchangeable chamber can prevent powder from escaping from the interchangeable chamber, in particular at its top, and thus powder contamination of the environment and/or an operator, when the interchangeable chamber is removed from the device and, if necessary, transported to another location can be prevented. In the case of a building material in powder form, dust reactions during storage and transport of the interchangeable chamber with the object and building material located inside can thus be avoided. Furthermore, for example, an operator can be protected from the danger of burns caused by too hot building material and/or vapors.

Various types of powders can be used as building materials, in particular metal powders, plastic powders, ceramic powders, sand, in particular plastic-coated sand, filled or mixed powders. Preferably, the interchangeable chamber can be closed so tightly by the cover that powder grains of the building material with the smallest available dimension cannot be let into or out of the interchangeable chamber. Instead of a powder, other suitable materials can be used as building material.

Preferably, during operation, the interchangeable chamber is coupled to a lifting device and the lifting device can only be actuated when the interchangeable chamber is open at its top, i.e. the cover does not close the top. The lifting device can be both a lifting device which lifts or lowers the entire interchangeable chamber and/or a lifting device which lifts or lowers a platform within the building container and/or within a storage container.

This can, for example, further improve the operational safety of the device because it is absolutely essential that the cover does not close the interchangeable chamber during the building process. In other words, there is a kind of locking mechanism that prevents the lifting device from moving when the top of the interchangeable chamber is closed by the cover.

Preferably, during operation, the three-dimensional object can only be produced in the interchangeable chamber when the interchangeable chamber is open at its top, i.e. the cover does not close its top. This can, for example, prevent operating errors and further improve the operational safety of the device. The same applies here as mentioned in the last section.

Furthermore, the cover is preferably suitable for sealing the interchangeable chamber on its top in a gas-tight manner. This protects an interior region of the interchangeable chamber and the powder located therein from the intrusion of gases such as oxygen. In particular, it is avoided that unsolidified powder, which is located in the storage container, can come into contact with the ambient air or other gases after removal from the device and could be damaged or changed by reacting, for example oxidation, or enrichment (especially with oxygen). This is particularly advantageous if the object and the unsolidified building material have an elevated temperature, especially after the object has been produced.

Gas-tight sealing of the interchangeable chamber at its top by the cover is preferably implemented by means of a circumferential seal, for example a sealing ring such as a silicone ring arranged in a groove.

Further preferably, the entire interchangeable chamber is preferably configured to be gas-tight or can be closed in such a way that it is gas-tight. Thus, for example, the interchangeable chamber can be removed from the device with building material or a three-dimensional object that is still hot from the production process, without the danger of inflammation and/or explosions and/or undesired chemical reactions.

In a further development, the cover of the interchangeable chamber can be provided with a heat protection material. Thus, the removal and further transport of the interchangeable chamber can be rendered even safer.

In an even further development, the interchangeable chamber can be thermally insolated as a whole.

Moreover, the cover can also consist of a plate or of several individual segments in order to minimize the building space or to implement automation for opening and closing the cover within the device, for example under inert gas atmosphere. The use of segments, for example, has the advantage that they have smaller dimensions than a plate of one piece, making them easier to store or to accommodate in the device.

Furthermore, the interchangeable chamber preferably comprises a sensor that is configured to detect whether the interchangeable chamber is closed or opened by means of the cover. This can, for example, further simplify the operation of the device and increase safety, since the sensor signal can be used to block or specifically allow operation of the device.

The interchangeable chamber preferably has a coupling device for coupling to a transport device, wherein the coupling device preferably can only be coupled to the transport device when the interchangeable chamber is closed by means of the cover. This reduces the risk of operating errors and simplifies handling. Here, too, a locking mechanism is applied, i.e. an automatic mechanism that allows the interchangeable chamber to be transported only in the closed state.

In a further development a safety device is provided in order not to lose the interchangeable chamber during transport, i.e. to connect it sufficiently firm to a transport device (in particular in a form-fitting manner).

Preferably, the cover can be brought from an opened to a closed position or vice versa by performing a pivoting and/or translational movement, wherein preferably the cover can first be brought from the opened position to a substantially parallel position to an upper edge of the side wall by a pivoting movement when it is closed, and then can be brought to the closed position by a translational movement substantially parallel to the upper edge, and vice versa. This makes optimum use of the space in the device, for example. In addition, operability is facilitated, for example.

Further preferably, in an open position the cover extends substantially parallel to a portion of the side wall. This makes even better use of the space in the device, for example.

Furthermore, preferably the side wall and/or the cover has at least one guide means for guiding the cover during opening and closing of the cover, wherein preferably the guide means comprises at least a first and a second section and the first and the second section are arranged at an angle to one another and/or wherein at least one of the two sections has a curvature. Thus the interchangeable chamber with the cover has a simple and easy to use structure.

Moreover, the interchangeable chamber preferably has a locking mechanism for locking the cover in the closed and/or opened position. This further increases operational safety because the locking mechanism ensures that the cover cannot be moved out of its current position in an uncontrolled way.

Furthermore, the interchangeable chamber is preferably equipped with and/or coupled to an actuator which causes an automatic or semi-automatic movement of the cover during operation. This can, for example, further simplify operation, as a user does not have to carry out the movement himself, but the movement is carried out controlled or supported by the actuator.

In an additional further development, the cover or the chamber wall can be equipped with a sensor device which can be used to monitor, for example, the oxygen content and/or the temperature in the interchangeable chamber. The sensor signals can be monitored in an external station into which the interchangeable chamber is brought and the conditions in the interchangeable chamber can be controlled accordingly.

According to the invention, a device for producing a three-dimensional object by selectively layer-wise solidifying of a building material at locations that correspond to the cross-section of the object to be produced in the respective layer comprises at least a device for selectively layer-wise solidifying the building material at locations that correspond to the cross-section of the object to be produced in the respective layer and an interchangeable chamber as described above. Thus, an efficient and operational safe device for producing a three-dimensional object is provided, which device has the same advantages as the interchangeable chamber described above, for example. In addition, the device allows, for example, filling of the storage container and emptying of the overflow container outside the device due to the interchangeable chamber being removable, which is also advantageous for keeping the device clean.

Preferably, the interchangeable chamber can be removed from the device and inserted into it again. Thus, for example, a new cycle for building of a three-dimensional object can be started immediately after removal of the interchangeable chamber.

Furthermore, the interchangeable chamber is preferably designed such that the cover can be brought from an opened to a closed position and vice versa when the interchangeable chamber is located within the device and/or the interchangeable chamber can only be removed from the device when the interchangeable chamber is closed by means of the cover. This, for example, increases the operational safety of the device, since the cover or the interchangeable chamber can only be moved when they are in a position or operating state designated therefore, again in the sense of a locking function.

In a further development, the device has a housing with an opening through which the interchangeable chamber can be introduced and removed and wherein the cover in its opened position faces the opening. Further preferably, in the opened position the cover conceals the coupling device and/or handles at the interchangeable chamber so that the interchangeable chamber cannot be removed from the housing when the cover is in the opened position. This can also contribute to operational safety and works analogously to a locking mechanism.

According to the invention, the method of producing a three-dimensional object by selectively layer-wise solidifying of a building material at locations that correspond to the cross-section of the object to be produced in the respective layer in a device for producing a three-dimensional object is operated with an interchangeable chamber described above.

Preferably, in the method, the interchangeable chamber is introduced into the device with its cover closed, the cover of the interchangeable chamber is opened in the device and the object to be produced is produced in the interchangeable chamber with the cover open. After completion of the production process, the interchangeable chamber is closed by the cover within the device and the interchangeable chamber with the three-dimensional object produced is removed from the device with the cover closed. This prevents, for example, powder contamination of the environment and/or of the operator. Furthermore, it is particularly avoided that the powder comes into contact with gases from the surroundings and that machine downtime is caused by waiting periods before removal of the interchangeable chamber. This allows, for example, the process to be implemented efficiently and safely.

BRIEF DESCRIPTION OF THE DRAWINGS

Further features and expediencies of the invention are set out in the description of exemplary embodiments and the attached figures.

DETAILED DESCRIPTION OF THE EMBODIMENTS

Figure 1:
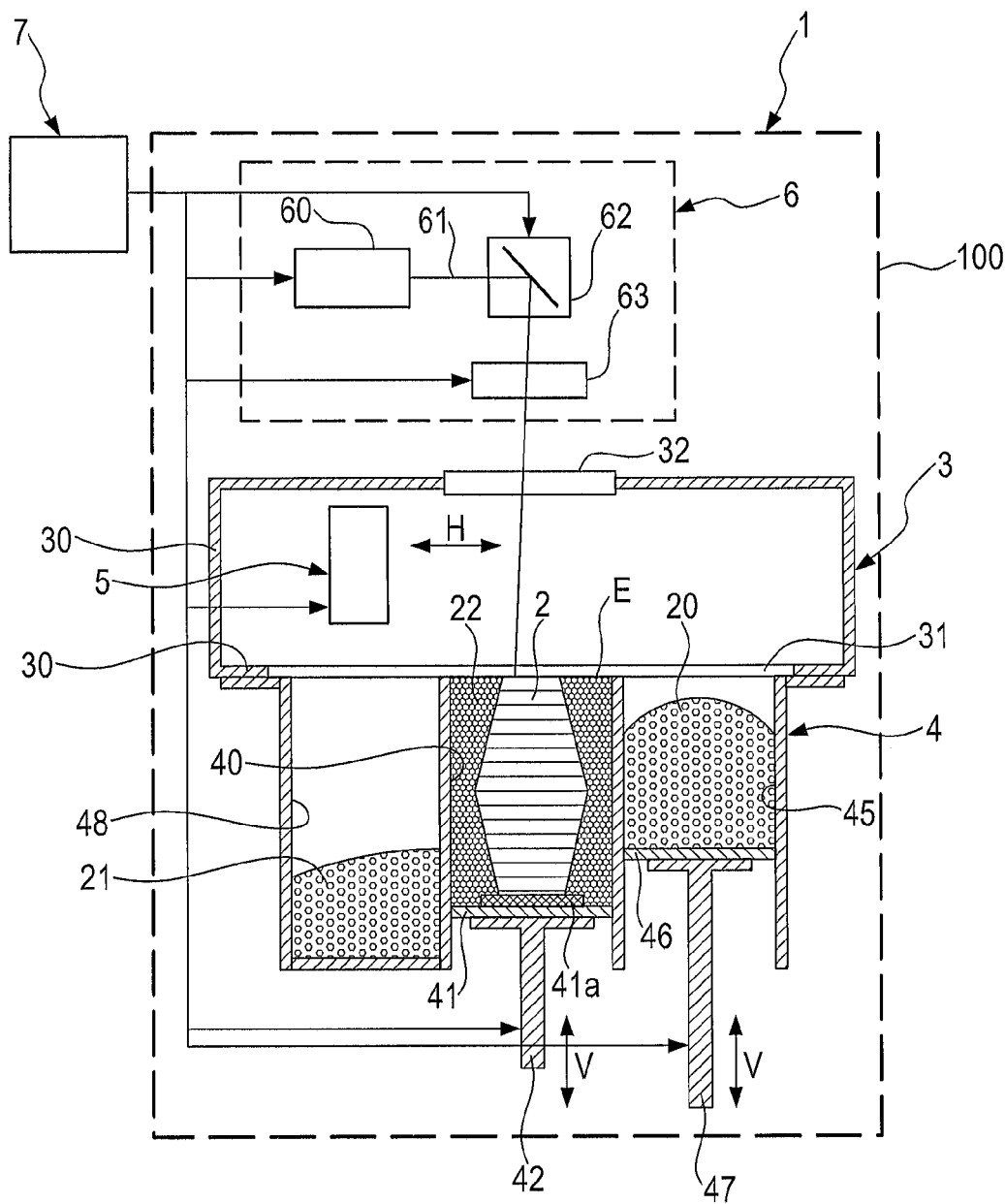
FIG. 1 shows a schematic view, partially in cross-section, of a device for generatively producing a three-dimensional object according to an embodiment of the present invention.

Hereafter, an embodiment of the present invention is described with reference to FIG. 1. The device shown in FIG. 1 is a laser sintering or laser melting device 1 for producing a three-dimensional object 2. The device comprises a processing chamber 3 with a chamber wall 30 and an opening 31 at its bottom. An interchangeable chamber 4 can be docked to the processing chamber 3, which interchangeable chamber can be introduced into the device 1 and can be removed from it. In the docked state the three-dimensional object 2 can be built within the interchangeable chamber 4. The processing chamber 3 and the interchangeable chamber 4 are preferably accommodated in a housing 100.

The interchangeable chamber 4 is composed of a building container 40, a storage or metering container 45 for a building material 20 that can be solidified by electromagnetic radiation, and an overflow container 48 for receiving excess building material 21. Preferably, the building material is a powder suited for laser sintering or laser melting. The building container 40, the storage container 45 and the overflow container 48 are open to their top. In the building container 40 which, together with the processing chamber 3, defines a building space, a building platform support 41 is arranged that seals the building container 40 at the bottom and thus forms the bottom thereof. A building platform 41a is attached, preferably detachably attached, to the building platform support 41. The three-dimensional object 2 can be built on the building platform 41a. The building platform support 41 preferably comprises seals not shown in FIG. 1 for sealing the building container 40 to the bottom. The building platform support 41 is attached on or to a support device 42 that can be moved in a vertical direction V. In FIG. 1, the object 2 to be formed in the building container 40 on the building platform 41a is shown in an intermediate state with several solidified layers, surrounded by building material 22 that remained unsolidified.

In the storage container 45 a further platform 46 is arranged that seals the storage container 45 at the bottom and thus forms the bottom thereof. The platform 46 preferably comprises seals not shown in FIG. 1 for sealing the storage container 45 to the bottom. The platform 46 is attached on or to a further support device 47 that can be moved in a vertical direction V. The support devices 42, 47 and the associated building platform support 41 or the platform 46 can also be formed as one piece.

The support device 42 for the building platform support 41 or the building platform 41a of the building container 40 and the support device 47 for the platform 42 of the storage container 45 are preferably coupled to lifting devices provided in the laser sintering device 1 and not shown in FIG. 1, by means of which lifting devices a vertical lifting and/or lowering movement is carried out.

A working plane E is defined by the upper edge of the building container 40. Preferably the storage container 45 and/or the overflow container 48 are arranged such that the upper edge of the storage container 45 and/or the upper edge of the overflow container 48 are located in the working plane E.

Furthermore, the device 1 comprises a lifting device not shown in the figures to lift the interchangeable chamber 4 within the housing 100 to the processing chamber 3. By this, the interchangeable chamber 4 can be docked to a lower edge of the wall 30 of the processing chamber 3. Moreover, an application device 5 that can be moved in a horizontal direction H for applying the building material 20 to the working plane E is provided in the processing chamber 3. Furthermore, the processing chamber 3 has a coupling window 32 at its upper side facing away from the interchangeable chamber for allowing radiation to pass through, for example an F-Theta lens.

The laser sintering device 1 further comprises an irradiation device 6 with a laser 60 which produces a laser beam 61 which preferably can be deflected by a deflection device 62 and is directed into the processing chamber 3 and focused upon the working plane E through the coupling window 32 by way of a focusing device 63. The deflection device 62 is preferably configured to deflect the laser beam to any desired position in the working plane E.

Furthermore, the laser sintering device 1 comprises a control unit 7 by which the individual components of the device 1 can be controlled in a coordinated manner in order to implement the building process. The control unit can comprise a CPU, the operation of which is controlled by a computer program (software). The computer program can be stored separately from the device on a storage medium from which it can be loaded into the device, in particular into the control unit.

Figure 2:
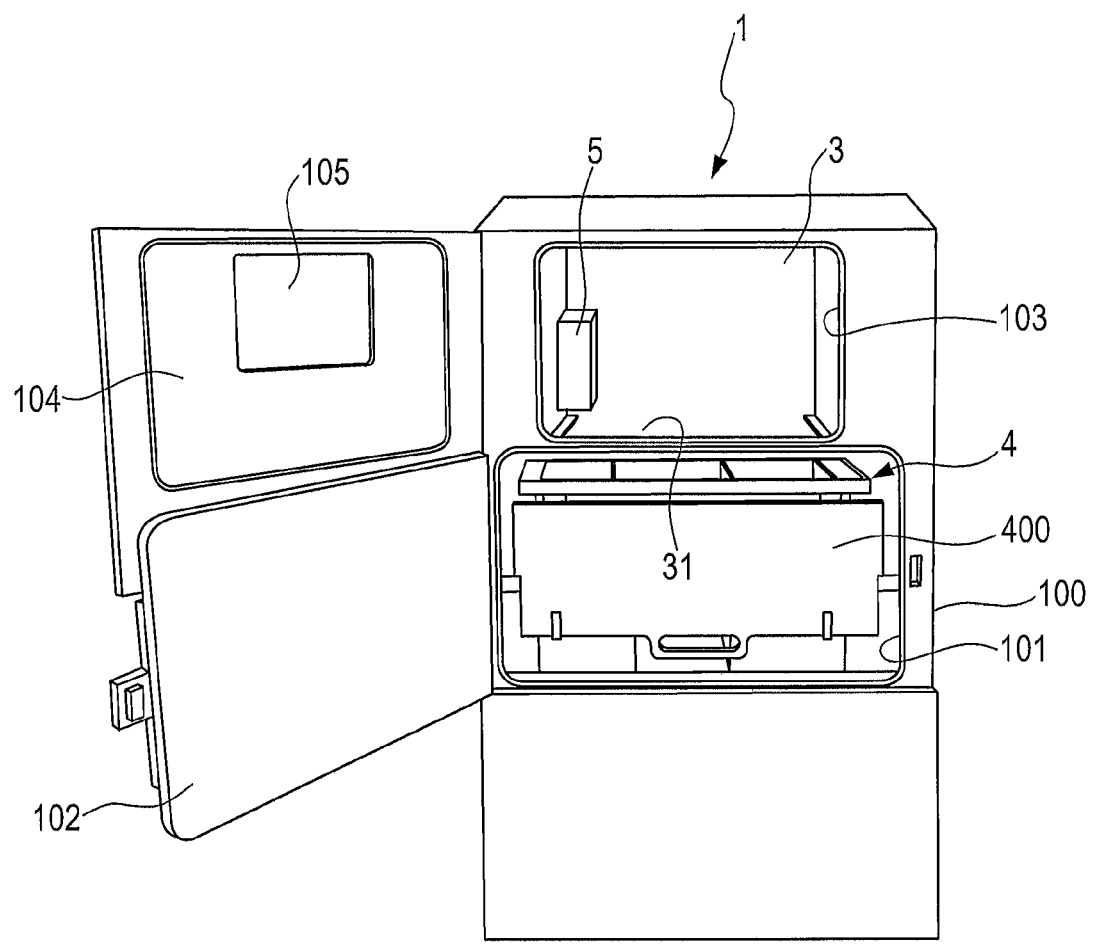
FIG. 2 shows a schematic perspective view of the device for producing a three-dimensional object with an inserted interchangeable chamber according to an embodiment of the invention in an opened state of the cover.

FIG. 2 shows another schematic view of the device 1 shown in FIG. 1. The irradiation device 6 is arranged, for example, in an upper region (not shown) in the housing 100, below it the processing chamber 3 is located and below the processing chamber the interchangeable chamber 4 is located. A part of the wall of the housing 100 can also be a wall of the processing chamber 3. The housing 100 preferably has a first opening 101 for introducing and removing the interchangeable chamber 4. Preferably, the first opening 101 is closable by a door 102. In the region of the processing chamber 3 a second opening 103 can be provided, which is also closable by a door 104 that can have a viewing window 105.

The interchangeable chamber 4 is described in detail below with reference to FIGS. 2 to 6. In the exemplary embodiment shown, the building chamber 40, the storage chamber 45 and the overflow chamber 48 and the associated platforms 41, 46 are each designed with a square or rectangular cross-section. However, this is not mandatory, but can also be other shapes. The walls of the containers are preferably arranged or fixed to be flush with each other and form side walls of the interchangeable chamber 4, wherein a side wall 401 that forms a long side of the interchangeable chamber 4 faces the first opening 101 after insertion into the housing 100. For docking to the processing chamber 3, the interchangeable chamber 4 has on its top an edge 43 surrounding the building container 40, the storage container 45 and the overflow container 48, which edge is suitable for being pressed against a bottom 31 in the form of a frame of the processing chamber 3. A seal 44 is provided on the upper side of the edge 43, for example in the form of a sealing ring located in a circumferential groove, in particular a silicone ring.

Furthermore, the interchangeable chamber 4 has a cover 400 that is adapted to cover the interchangeable chamber 4 at its top and to close it such that building material substantially cannot get through the cover 400 out of the interchangeable chamber 4 nor into it. A contour of the cover 400 substantially corresponds to a contour of the frame 43. As a result, when the cover 400 rests on the frame 43 in a closed position, it also rests on the seal 44, so that the interchangeable chamber can be closed in a powder-tight manner in the closed position of the cover. Preferably, in the closed position shown in FIG. 3, the cover can be locked with the interchangeable chamber 4, in particular in such a way that the cover 400 is pressed against the seal 44. In a preferred embodiment, the cover 400 closes the interchangeable chamber 4 not only in a powder-tight manner but also in a gas-tight manner. In this case no vapors, which can possibly be generated in the interchangeable chamber 4 by the still hot object, can escape from the interchangeable chamber 4. On the other hand, no gas or in particular oxygen can enter the interchangeable chamber when it is removed from device 1.

For correct positioning of the interchangeable chamber 4 at the processing chamber 3, positioning sleeves 49 can be provided on the upper edge 43 of the interchangeable chamber, which can interact with corresponding positioning pins at the processing chamber 3.

The seal 44 is also suited for sealing the junction between the interchangeable chamber 4 and the processing chamber 3 when the interchangeable chamber 4 is in an opened state.

The cover 400 is movably coupled to the interchangeable chamber 4. In particular, the cover 400 is movable from a closed position shown in FIG. 3 to an opened position shown in FIG. 4 and vice versa. For this purpose, guide elements 404, which extend in a horizontal direction perpendicular to the side wall 401, are provided on opposite sides of the frame 43 each. The guide elements 404 preferably have a groove or slot which in a first section 405 runs substantially horizontally and in an end section 406 runs inclined downwards in the direction of the side wall 401. As can be seen in particular from FIG. 6, at the transition location of the sections 405, 406 the groove is slightly widened and rounded upwards to allow the cover 400 to pivot slightly. Both ends of the grooves are closed. The guide elements 404 each serve to accommodate an engagement element 407 which can, for example, be designed as a roller or a pin and is guided within the grooves. The engagement elements 407 are each firmly attached to the outer edge of the cover 400 on the sides corresponding to the guide elements 404 by means of, for example, a triangular slat 408. Preferably, the engagement elements 407 are spaced from the actual cover in order to allow a pivoting movement.

Figure 3:
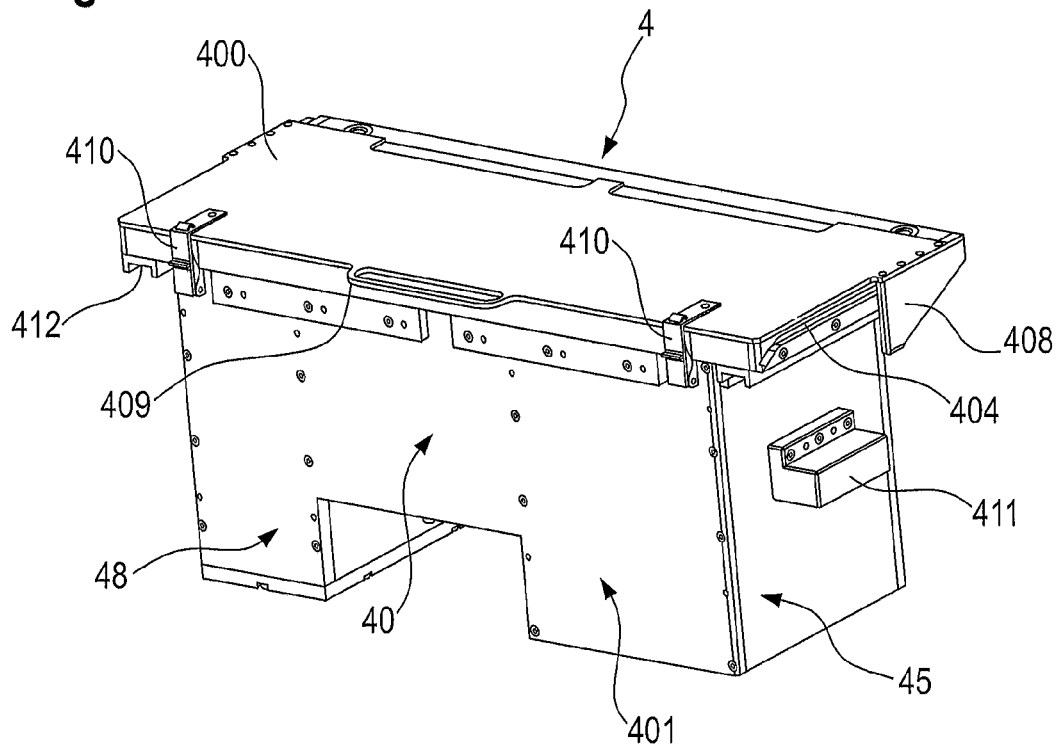
FIG. 3 shows a schematic perspective view of the interchangeable chamber of FIG. 2 with the cover closed.
Figure 4:
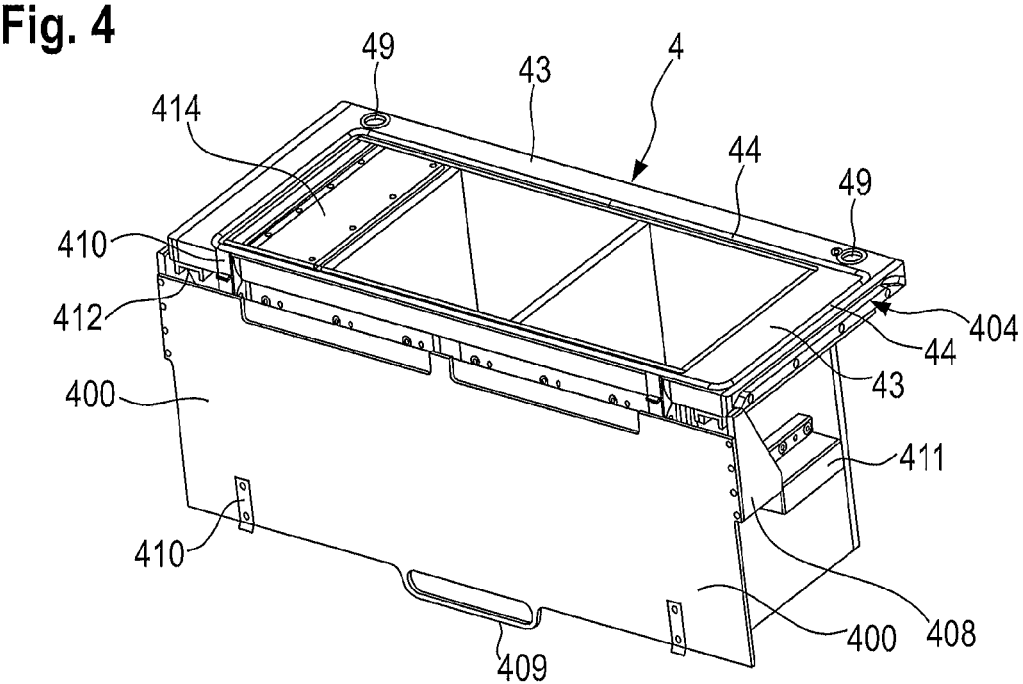
FIG. 4 shows a schematic perspective view of the same interchangeable chamber with the cover opened.
Figure 5:
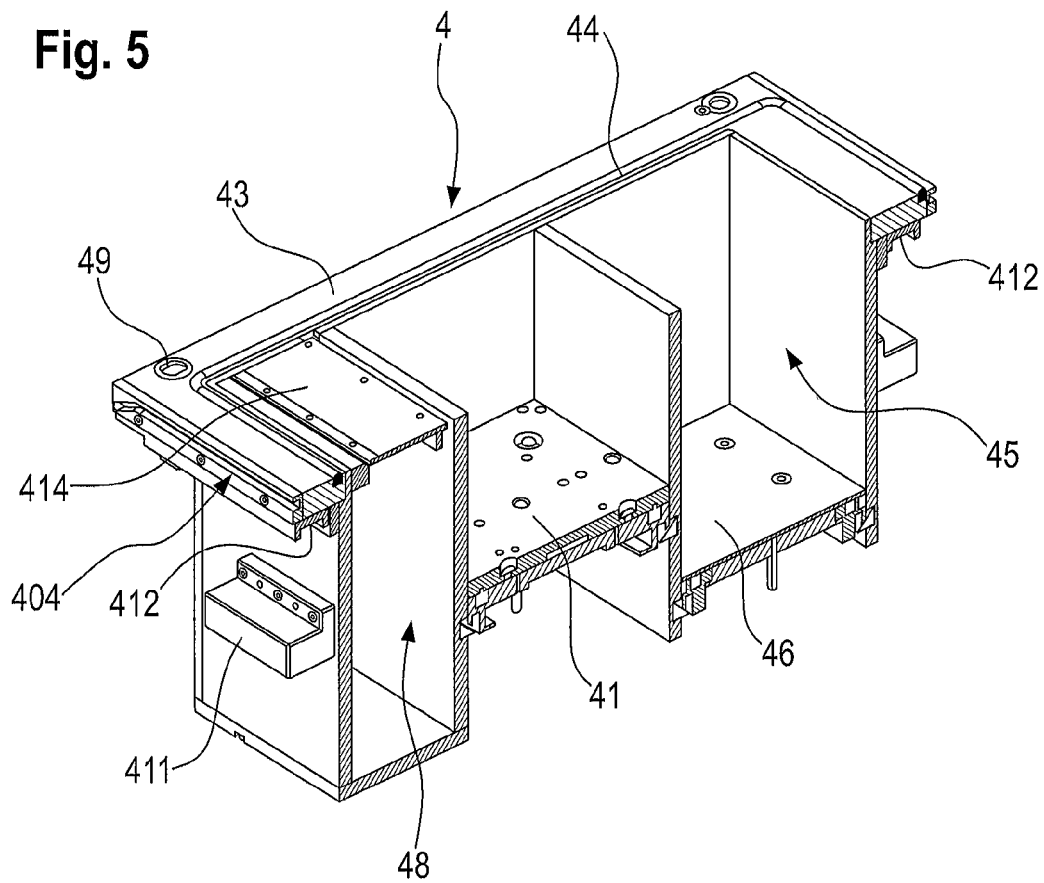
FIG. 5 shows a schematic perspective view of the same interchangeable chamber with a side wall omitted and the cover omitted.
Figure 6:
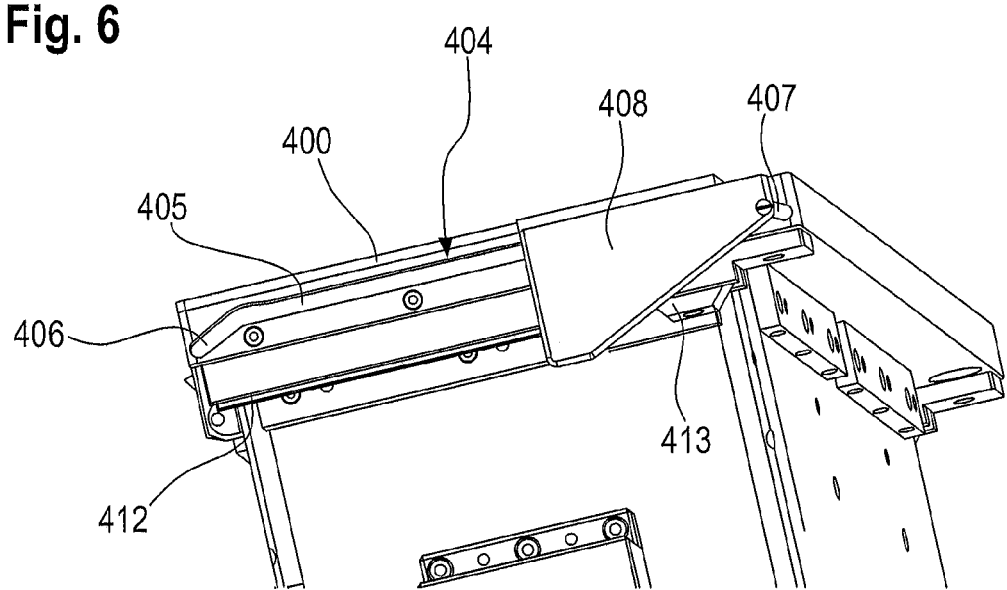
FIG. 6 shows a schematic view of a detail of FIG. 3.

The guide elements 404 and the engagement elements 407 are designed and cooperate such that the cover 400 can be moved from an opened position as shown in FIG. 4 to a closed position as shown in FIG. 3 by pivoting the cover 400 and then sliding the cover 400 onto the frame 43. The cover can also be moved from the closed position shown in FIG. 3 to the opened position shown in FIG. 4 by displacing it and then pivoting it. In the opened position the cover 400 extends substantially parallel to the side wall 401 of the interchangeable chamber 400. In this position the engagement element 407 is also at the end of the inclined region 406 of the groove and is held by the closed end of the groove 405 so that the cover 400 hangs at the frame 43 substantially parallel to the side wall 401. By pushing the cover 400 upwards, the engagement element 407 moves in the groove 405 until the cover 400 is pushed over the frame 43 and the engagement element 407 abuts the end of the groove 405.

To allow a user to operate opening and closing of the cover 400, a handle 409 can be provided on the side of the cover 400 that is opposite to the engagement elements 407. In addition, optional locking elements 410 are provided on the side wall 401, which locking elements lock the cover 400 in the closed position with the rest of the interchangeable chamber 4 and the cover 400. For example, the locking elements 410 can be attached at the side of the handle 409 to facilitate operation by a user before removing the interchangeable chamber 4 from device 1.

The interchangeable chamber 4 is insertable into the device 1 in such a way that the side wall 401 faces the first opening 101. In this position, the handle 409 and the locking elements 410 can then also be accessed by the operator when the door 102 is open.

In addition, the interchangeable chamber 4 can have handles 411 on the side walls adjacent to the side wall 401, which handles serve for lifting by hand or for coupling to equipment. Preferably, the interchangeable chamber 4 has rails or other engagement structures 412 at the lower region of the frame 43 on both sides of the side wall 401, which rails or other engagement structures serve, for example, for gripping from below by the arms of a lifting carriage. A securing device 413, e.g. a pin, can be provided to secure the interchangeable chamber 4 to the lifting carriage.

Preferably an actuator (not shown) is provided, which causes an automatic or semi-automatic movement of the cover during operation.

Optionally, the interchangeable chamber 4 can comprise a pivotable cover flap 414 on the overflow container 48 for protection from dust.

In the housing 100 of the device 1, as shown in FIG. 2, a sensor (not shown) can be provided on a support in a region behind the cover flap 400, which sensor detects whether the cover flap 400 is in front of it. The sensor thus detects the opened position of the cover flap 400. The control of the lifting devices can be configured in such a way that the lifting devices only move the platforms 41 and 46 when the interchangeable chamber 4 is open, i.e. the cover 400 is in the opened position.

When the interchangeable chamber 4 is located within the device 1 and the cover 400 is in the opened position, the engagement structures 412 and/or the handles 411 are concealed by the cover 400 located substantially parallel to the side wall 401 such that the interchangeable chamber 4 cannot be removed from the device 400 when the cover 400 is in the opened position.

Figure 7:
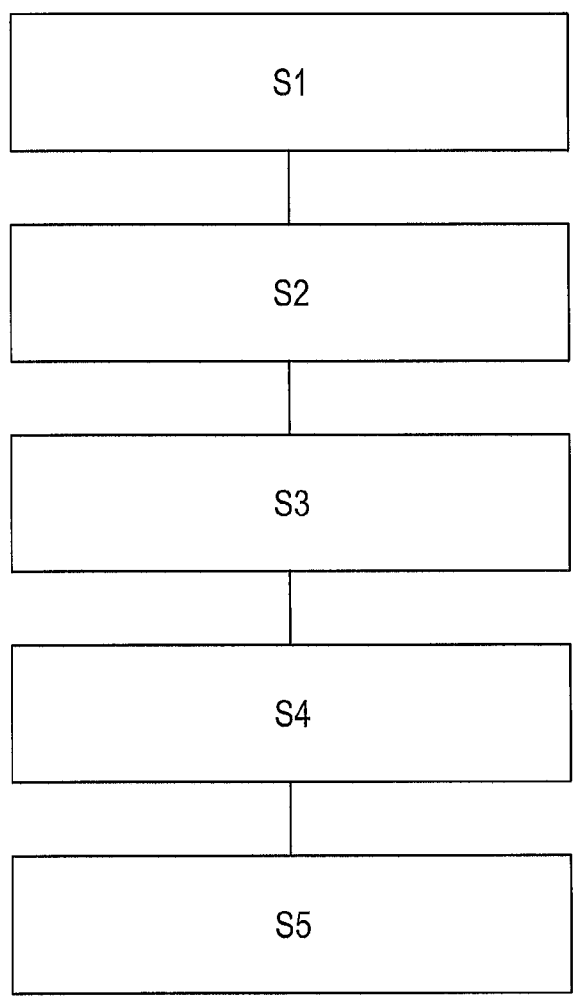
FIG. 7 shows a schematic depiction of an exemplary embodiment of the method according to the invention.

With reference to FIG. 7, in operation, the interchangeable chamber 4 is prepared for the building process outside of the device 1. For this purpose, for example, the storage container 45 is filled with building material 20. Then the cover 400 is brought from the opened position to the closed position and preferably locked for transport by means of the locking elements 410. The interchangeable chamber 4 is then introduced through the first opening 101 into the housing 100 with its cover 400 closed (step S1). Introducing takes place, for example, by means of a transport device, e.g. by means of a lifting carriage, or also by hand.

The interchangeable chamber is placed in the housing on a base which can be lifted by means of a lifting device, and is coupled to the lifting devices for the support devices 42, 47 (wherein this step can also be carried out later, in particular after the measures mentioned in the next paragraph).

The cover is then brought from the closed position to the opened position (step S2). In order to do so, the locking 410 is released in case the cover 400 had been locked. The cover 400 is first pulled substantially parallel to the frame 43 towards the user by means of the handle 409, wherein the engagement elements 407 are guided in the guide elements 404. When the engagement elements 407 reach the inclined end region 406 of the groove, the cover 400 can be pivoted downwards so that it is arranged substantially parallel to the side wall 401. The sensor detects the presence of the cover and outputs a release signal for the lifting devices. It is then possible to lift the entire interchangeable chamber 4 against the processing chamber 3 by means of a lifting device (not shown). The interchangeable chamber 4 is then locked with the processing chamber 3. Then the first door 102 is closed.

To operate the entire device the second door 104 is also closed. Then the building process is carried out in which the object is produced (step S3) and which is described below. In order to apply a layer of the building material 20, first the building platform support 41 is lowered by an amount that corresponds to the desired layer thickness and the platform 46 is moved upwards in order to provide a sufficient amount of building material 20 to the application device 5.

A layer of the building material 20 is then applied to the building platform 41a or to an already selectively solidified layer of the building material 20 by moving the application device 5 across the working plane E. Application takes place at least over the entire cross-section of the object 2 to be produced, preferably over the entire build area, i.e. the area of the working plane E located within the upper opening 103 of the building container 40. In doing so, excess building material 21 can be supplied to the overflow container 48. Then, the cross-section of the object 2 to be produced is scanned by the laser beam 61 so that the building material 20 in powder form is solidified at those locations that correspond to the cross-section of the object 2 to be produced. These steps are repeated until object 2 is completed.

After completion of the building process, the interchangeable chamber 4 is first uncoupled from the processing chamber 3 (if necessary by previously disconnecting the lifting devices from the support devices 42, 47) by moving the processing chamber downwards. After opening the door 102, the user can pivot the cover 400 and slide it onto the frame 43 of the interchangeable chamber 4 and lock it if necessary (step S4). When the cover 400 is in the closed position, the handles 411 or the engagement structures 412 for a lifting apparatus are exposed again and the interchangeable chamber 4 can be removed either manually or by means of a transport device through the opening 101 out of the device 1 (step S5).

Preferably immediately after removal of the interchangeable chamber 4, a further interchangeable chamber 4 can be introduced into the device 1 in order to carry out a further building process. This enables efficient operation.

If required, the interchangeable chamber 4 or the completed object 2 can undergo further process steps. These can comprise the following steps or a selection of them in substantially any order:

Cooling of the object 2 produced in the closed interchangeable chamber.
Removing the cover 400 from the interchangeable chamber 4.
Removing the unsolidified building material surrounding the object 2.
Removing the object 2 from the interchangeable chamber 4.
Removing the building material 21 from the overflow container 48 and/or from the storage container 45.
Cleaning the interchangeable chamber 4 and the components arranged therein.

In a modified embodiment, the interchangeable chamber 4 only comprises a building container 40 and a storage container 45. In a further modified embodiment, the interchangeable chamber 4 only comprises a building container 40. In an even further embodiment, the interchangeable chamber has a first storage container at one side of the building container and a second storage container which is substantially designed in the same way as the first storage container at the opposite side of the building container. This allows the recoater to apply material from the second storage container across the build area for applying a further layer and then it can return to the first storage container.

In a further embodiment, the interchangeable chamber can be thermally insulated. This allows the outer surface to be kept at a lower temperature than the inner surface of the wall of the interchangeable chamber, which facilitates removal of the interchangeable chamber immediately after the building process and prevents the risk of burns to an operator.

The invention is not limited to the specifically described embodiment of a laserintering device, but can be realized in any laserintering device that allows introduction of an interchangeable chamber.

Even though the present invention was described with regard to a laser sintering or laser melting device, it is not limited to laser sintering or laser melting. It can be applied to any methods for generatively producing a three-dimensional object by layer-wise application and selective solidification of a building material.

The irradiation device can comprise, for example, a gas or solid state laser or any other kind of laser, such as laser diodes, in particular VCSEL (Vertical Cavity Surface Emitting Laser) or VECSEL (Vertical External Cavity Surface Emitting Laser) or an array of these lasers. In general, any device can be used as an irradiation device with which energy in the form of wave radiation or particle radiation can be applied selectively to a layer of building material. Instead of a laser, for example, a different light source, an electron beam or any other source of energy or radiation can be used which is suited for solidifying the building material. Instead of deflecting a beam, irradiation can also be implemented by means of a movable array irradiation device. The invention can also be applied to selective mask sintering, in which an extended light source and a mask are used, or the invention can be applied to high speed sintering (HSS), in which a material is selectively applied to the building material that increases (absorption sintering) or reduces (inhibition sintering) the absorption of radiation at the respective locations and then is irradiated unselectively and in a large area or by means of a movable array irradiation device.

Instead of introducing energy, selective solidification of the applied building material can also be implemented by means of 3D-printing, for example by applying an adhesive. In general, the invention is directed to the generative production of an object by means of layer-wise applying and selectively solidifying a building material in powder form, regardless of the manner in which the building material is solidified.

The invention claimed is:

1. A device for producing a three-dimensional object by selectively layer-wise solidifying a building material at locations that correspond to the cross-section of the object to be produced in the respective layer, the device comprising:
   a device for selectively layer-wise solidifying the building material at locations that correspond to the cross-section of the object to be produced in the respective layer; and
   an interchangeable chamber including:
      a building space for receiving a building platform on which the three-dimensional object is produced, wherein the building space is configured to be temporarily open in a direction of the top of the interchangeable chamber;
      a side wall;
      a cover pivotably and/or displaceably coupled with the side wall; and
      a lifting device coupled to the interchangeable chamber so as to dock the interchangeable chamber to a processing chamber of the device and wherein the lifting device is actuatable only when the cover does not close the interchangeable chamber,
      wherein the cover is adapted to close the interchangeable chamber at the top such that the building material substantially cannot pass through the cover.

2. The device according to claim 1, wherein the interchangeable chamber is removable from the device for producing the three-dimensional object and insertable into the device for producing the three-dimensional object.

3. The device according to claim 1, wherein the interchangeable chamber is configured to permit the cover to open and close when the interchangeable chamber is located within the device for producing the three-dimensional object and/or wherein the interchangeable chamber is configured to permit removal from the device for producing the three-dimensional object only when the interchangeable chamber is closed by the cover.

4. The device according to claim 1, wherein the interchangeable chamber is configured such that the three-dimensional object can be produced in the interchangeable chamber only when the cover does not close the interchangeable chamber.

5. The device according to claim 1, wherein the interchangeable chamber further comprises a seal configured to seal the interchangeable chamber in a gas-tight manner when the cover closes the interchangeable chamber.

6. The device according to claim 1, further comprising a sensor that is configured to detect whether the interchangeable chamber is closed or opened by the cover.

7. The device according to claim 1, wherein the interchangeable chamber couples to a transport device only when the interchangeable chamber is closed by the cover.

8. The device according to claim 1, wherein the interchangeable chamber further comprises a guide structure for guiding the cover from an opened position to a closed position or vice versa by performing a pivoting and/or translational movement, such that when closing, the cover moves first from the opened position to a substantially parallel position to an upper edge of the side wall by a pivoting movement and then moves to the closed position by a translational movement substantially parallel to the upper edge, and vice versa.

9. The device according to claim 1, wherein the side wall and/or the cover of the interchangeable chamber has at least one guide for guiding the cover during opening and closing of the cover, wherein the guide comprises at least a first section and a second section and the first section and the second section are arranged at an angle to one another and/or wherein at least one of the first and second sections has a curvature.

10. The device according to claim 1, wherein the interchangeable chamber has a locking mechanism for locking the cover in the closed and/or opened position.

11. The device according to claim 1, equipped with and/or coupled to an actuator which causes an automatic or semi-automatic movement of the cover during operation.

12. The device according to claim 1, wherein the interchangeable chamber further comprises a storage container for storing building material.

13. A method of producing a three-dimensional object by selectively layer-wise solidifying a building material at locations that correspond to the cross-section of the object to be produced in the respective layer, in a device for producing a three-dimensional object according to claim 11, comprising:
   introducing the interchangeable chamber into the device with the cover closed;
   opening the cover of the interchangeable chamber within the device;
   producing the object to be produced in the interchangeable chamber with the cover open; and
   closing the interchangeable chamber with the cover within the device after completion of the production process; and
   removing the interchangeable chamber with the three-dimensional object produced from the device with the cover closed.

* * * * *